(12) United States Patent
Routeau et al.

(10) Patent No.: US 7,600,569 B2
(45) Date of Patent: Oct. 13, 2009

(54) METHOD FOR INSTALLING AND CONNECTING A SUB-SEA RISER

(75) Inventors: Sylvain Routeau, Saint-Cloud (FR); Ludwig Gross, Paris (FR); Didier Renard, Courbevoie (FR)

(73) Assignee: Technip France (FR)

( * ) Notice: Subject to any disclaimer, the term of this patent is extended or adjusted under 35 U.S.C. 154(b) by 158 days.

(21) Appl. No.: 10/571,326

(22) PCT Filed: Aug. 27, 2004

(86) PCT No.: PCT/FR2004/002200

§ 371 (c)(1),
(2), (4) Date: Apr. 24, 2006

(87) PCT Pub. No.: WO2005/028810

PCT Pub. Date: Mar. 31, 2005

(65) Prior Publication Data

US 2008/0014026 A1 Jan. 17, 2008

(30) Foreign Application Priority Data

Sep. 9, 2003 (FR) .................................. 03 10600

(51) Int. Cl.
*E21B 29/12* (2006.01)
(52) U.S. Cl. ..................... 166/344; 166/345; 166/367; 166/351; 405/158

(58) Field of Classification Search .................. 166/343, 166/367, 345, 348, 341, 351, 353; 405/224.2, 405/169, 170, 158, 172, 224
See application file for complete search history.

(56) References Cited

U.S. PATENT DOCUMENTS

| | | | | |
|---|---|---|---|---|
| 3,352,356 A | * | 11/1967 | Wakefield, Jr. | 166/352 |
| 3,373,807 A | * | 3/1968 | Fischer et al. | 166/342 |
| 3,524,325 A | * | 8/1970 | Brown | 405/169 |
| 3,642,063 A | * | 2/1972 | Jergins | 166/353 |

(Continued)

FOREIGN PATENT DOCUMENTS

| | | | | |
|---|---|---|---|---|
| GB | 2114700 A | * | 8/1983 | |
| GB | 2193775 A | * | 2/1988 | |

OTHER PUBLICATIONS

International Search Report PCT/FR2004/002200 dated Feb. 2, 2005.

*Primary Examiner*—Thomas A Beach
(74) *Attorney, Agent, or Firm*—Ostrolenk Faber LLp

(57) ABSTRACT

A method and a device for installing a sub-sea riser for an offshore operation, between a base installation disposed on the sea bed and a sea installation protruding above the base installation. The sub-sea riser is provided with a first end and a second end. The method comprises the following stages in the following order: a) the first end of the riser is joined to the sea installation; b) the sub-sea riser is deployed; c) the second end of the riser is guided towards the base installation; d) the second end is coupled to the base installation by releasing the second end and the efforts of the recoil force exerted on the base installation are transferred; e) the second end and the base installation are connected to each other.

12 Claims, 4 Drawing Sheets

U.S. PATENT DOCUMENTS

| | | | | |
|---|---|---|---|---|
| 3,690,112 A * | 9/1972 | Pattison et al. | ............... | 405/169 |
| 3,698,199 A * | 10/1972 | Matthews, Jr. | ............... | 405/169 |
| 3,724,061 A | 4/1973 | Schipper | ....................... | 29/464 |
| RE28,410 E * | 5/1975 | Cox et al. | ................. | 405/168.3 |
| 3,953,982 A * | 5/1976 | Pennock | ................... | 405/168.1 |
| 4,075,862 A * | 2/1978 | Ames | ......................... | 405/169 |
| 4,086,778 A * | 5/1978 | Latham et al. | .............. | 405/191 |
| 4,120,171 A * | 10/1978 | Chateau et al. | ............. | 405/169 |
| 4,133,182 A * | 1/1979 | Chateau | ...................... | 405/169 |
| 4,155,669 A * | 5/1979 | Rochelle | ..................... | 405/158 |
| 4,230,186 A * | 10/1980 | Lewis, Jr. | .................... | 166/342 |
| 4,266,886 A * | 5/1981 | Milton | ........................ | 405/169 |
| 4,310,263 A * | 1/1982 | Daughtry | ..................... | 405/169 |
| 4,317,488 A * | 3/1982 | Shotbolt | ..................... | 166/351 |
| 4,375,835 A * | 3/1983 | Archer | ........................ | 166/339 |
| 4,436,449 A * | 3/1984 | Smoot et al. | ................. | 405/170 |
| 4,457,378 A | 7/1984 | Watkins | | |
| 4,459,065 A * | 7/1984 | Morton | ........................ | 405/169 |
| 4,541,753 A * | 9/1985 | Langner | ...................... | 405/166 |
| 4,558,972 A * | 12/1985 | Langner | ...................... | 405/169 |
| 4,588,326 A * | 5/1986 | Langner | ...................... | 405/169 |
| 4,620,818 A * | 11/1986 | Langner | ...................... | 405/169 |
| 4,643,614 A * | 2/1987 | Laursen | ...................... | 405/169 |
| 4,661,017 A | 4/1987 | Wood et al. | .................. | 405/169 |
| 4,687,377 A * | 8/1987 | Langner | ...................... | 405/169 |
| 4,695,189 A * | 9/1987 | Wallace | ...................... | 405/169 |
| 4,704,050 A * | 11/1987 | Wallace | ................... | 405/224.2 |
| 4,730,677 A * | 3/1988 | Pearce et al. | ................. | 166/345 |
| 4,784,523 A * | 11/1988 | Louis et al. | .................. | 405/169 |
| 4,842,075 A * | 6/1989 | Kalvenes et al. | ............ | 166/341 |
| 4,848,970 A * | 7/1989 | Hunter et al. | ................ | 405/224 |
| 4,886,395 A * | 12/1989 | Moles et al. | ................. | 405/169 |
| 5,255,744 A * | 10/1993 | Silva | .......................... | 166/347 |
| 5,341,884 A * | 8/1994 | Silva | .......................... | 166/347 |
| 5,437,518 A * | 8/1995 | Maloberti et al. | ........... | 405/169 |
| 5,582,252 A * | 12/1996 | Richmond et al. | ........... | 166/352 |
| 5,593,249 A * | 1/1997 | Cox et al. | .................... | 405/191 |
| 5,730,551 A * | 3/1998 | Skeels et al. | ................. | 405/170 |
| 5,807,027 A | 9/1998 | Östergaard | .................. | 405/170 |
| 5,975,803 A | 11/1999 | Mackinnon | | |
| 6,321,844 B1 * | 11/2001 | Thiebaud et al. | ............ | 166/345 |
| 6,340,057 B1 | 1/2002 | Dantas | ........................ | 166/337 |
| 6,354,376 B1 * | 3/2002 | De Baan | ...................... | 166/338 |
| 6,405,802 B1 * | 6/2002 | Williams | ...................... | 166/344 |
| 6,481,504 B1 * | 11/2002 | Gatherar | ...................... | 166/344 |
| 6,769,840 B1 * | 8/2004 | Bernard | ....................... | 405/169 |
| 6,893,190 B2 * | 5/2005 | Macrea et al. | .............. | 405/209 |
| 6,915,754 B2 * | 7/2005 | Komura et al. | .............. | 114/293 |
| 7,025,535 B2 * | 4/2006 | Chiesa et al. | ................ | 405/169 |
| 7,044,228 B2 * | 5/2006 | Langford et al. | ............ | 166/350 |
| 7,360,968 B2 * | 4/2008 | van Zandwijk | ............. | 405/172 |
| 2003/0123936 A1 * | 7/2003 | Karal et al. | ................ | 405/223.1 |
| 2006/0067792 A1 * | 3/2006 | Joshi et al. | ................... | 405/171 |
| 2007/0081862 A1 * | 4/2007 | Wolbers et al. | ............. | 405/169 |
| 2008/0286050 A1 * | 11/2008 | DeLack | ....................... | 405/172 |

\* cited by examiner

METHOD FOR INSTALLING AND CONNECTING A SUB-SEA RISER

CROSS REFERENCE TO RELATED APPLICATION

The present application is a 35 U.S.C. §§ 371 national phase conversion of PCT/FR2004/002200, filed 27 Aug. 2004, which claims priority of French Application No. 0310600, filed 9 Sep. 2003. The PCT International Application was published in the French language.

BACKGROUND OF THE INVENTION

The present invention relates to a method of installing and connecting a subsea riser for an offshore operation and to a device designed to implement the method.

Known installation and connection methods are used for connecting subsea risers to seabed installations for example an oil production wellhead or a collector, which is connected to a set of wellheads, or else part of a fixed installation anchored to the seabed.

Two known types of method are used for connecting one end of a subsea riser to a seabed installation, a first type in which said end is guided and connected vertically to the installation, i.e. approximately perpendicular to the surface of the seabed, and a second type in which said end is connected horizontally to the seabed installation, approximately parallel to the surface of the seabed.

In the first type of method, the end of the subsea riser is made to approach the seabed installation vertically, by unreeling said riser from a surface ship. The reader may refer to document U.S. Pat. No. 4,457,378, which describes such a type of method. However, it is not very easy for the position of the end of the riser relative to the installation to be perfectly controlled when the surface ship is subject to the current or swell, and not only does the end of the riser, which is fragile, run the risk of deteriorating or being damaged by contact against the surface of the seabed or the seabed installation, but the seabed installation itself runs the risk of being damaged.

In contrast, methods of the second type avoid this hazard, since the subsea riser is firstly made in its entirety on the seabed and then the connection is made by means of subsea ROVs (remotely operated vehicles) which are put down on the seabed installation and pull the end of the subsea riser by means of a cable, or which are put down on said end and drive it right to the seabed installation. The other end of the subsea riser is then brought up to a surface installation, such as for example a platform. A method of this type is illustrated in document U.S. Pat. No. 5,975,803.

Thus, the end of the subsea riser is attached and connected to the seabed installation without striking it, thanks to the subsea robot that drives the riser in a continuous translational movement along the seabed. Moreover, this technique is particularly advantageous as it makes it possible to reduce the downtime of the surface vessel, which lays down the risers on the seabed. The vessel is then available for other operations, while the subsea robots proceed to connect the risers to installations.

However, in deep-sea production areas, the subsea risers are consequently very long, and they are ill-suited, on the one hand, for being driven along the seabed by subsea robots and, on the other hand, to be raised after one of their ends has been connected to the seabed installation.

SUMMARY OF THE INVENTION

It is therefore one object of the invention to provide a method for installing and connecting a subsea riser between a seabed installation and an installation lying above it, which method gets round the problem of the weight of the riser and of the tensile loads that it consequently generates.

For this purpose, according to a first object, the present invention proposes a method for installing and connecting a subsea riser, for an offshore operation, between a seabed installation placed on the seabed and an offshore installation that lies above said seabed installation, said riser having a first end and a second end, said method comprising the following steps in the order:

said first end is connected to said offshore installation;
said subsea riser is deployed in a catenary between said offshore installation and said seabed installation;
said second end is guided toward said seabed installation by extending said subsea riser, which exerts a restoring force on said second end;
said second end is fastened to said seabed installation, while slackening said second end (28) so as to position, thanks to said restoring force, said second end so as to face said seabed installation and to transfer the loads from said restoring force to said seabed installation; and
said second end and said seabed installation are connected together.

Thus, one feature of the installation method according to the invention lies in the way in which the subsea riser is connected, firstly via its first end to the offshore installation lying above the seabed installation and which may be a surface installation such as a platform then via its second end to the seabed or seabed installation, by deploying said riser and guiding said second end toward the seabed installation. The second end is then fastened to the seabed installation using the restoring force exerted by the riser, which makes it possible, by slackening said second end, to position it so as to face the seabed installation and then to transfer the restoring force loads to the seabed installation in order thereafter to be able to connect the second end and the seabed installation together.

Thus, not only is the step of raising the first end obviated, since it is already connected to the offshore installation and the riser deployed from the surface, but also it is possible to dispense with the use of subsea robots or even winches for driving the second end toward the seabed installation, which would then have to be of high power in order to compensate for the restoring force exerted by the catenary.

Advantageously, the seabed installation is formed from the free end of a flowline, which has no upper element liable to impede the approach of the second end so that the connection is made easier.

According to one particularly advantageous mode of implementation of the invention, said second end includes mobile first connection means and said seabed installation includes second connection means and in that said mobile first connection means are engaged in said second connection means before slackening said second end in order to attach it. Thus, the mobile first connection means are capable of being engaged in the second connection means when the second end of the subsea riser is made to approach the seabed installation. In this way, said connection means cooperate together and, as soon as the second end starts to be slackened, this end is held fastened to the seabed installation to which it transmits the restoring force exerted by the riser.

Preferably, said second end is guided from the surface by a cable extending between said second end and a surface vessel. Firstly, said surface vessel advantageously extends said subsea riser, by orienting its lower portion in a direction approximately parallel to said flowline until said second end is approximately in line with said seabed installation. It is then only that said mobile first connection means are engaged in said second connection means in order to connect them together.

As will be explained in greater detail in the rest of the description, when the cable has been fully slackened, the second end is positioned on the seabed and is adjusted relative to the seabed installation so as to be able to connect them together.

Particularly advantageously, the connection means transmit the restoring force of the subsea riser to the seabed installation and allow the connection to be made between the second end and the seabed installation without said restoring force being exerted on the actual connection.

According to another object, the present invention proposes a device for installing and connecting a subsea riser, for an offshore operation, between a seabed installation placed on the seabed and an offshore installation that lies above said seabed installation, said subsea riser having a first end and a second end, said device comprising: connection means for connecting said first end to said offshore installation; deployment means for deploying said subsea riser in a catenary between said offshore installation and said seabed installation; guiding means for guiding said second end in order to face said seabed installation by extending said subsea riser, which exerts a restoring force on said second end; fastening means for fastening said second end to said subsea installation, said second end being slackened so as to position, thanks to said restoring force, said second end so as to face said subsea installation and to transfer the loads from said restoring force to said subsea installation; and connection means for connecting said second end and said seabed installation together.

Thus, one feature of the device according to the invention lies in the way in which the fastening means cooperate, which means allowing the second end to be positioned so as to face the seabed installation thanks to the restoring force induced by the catenary subsea riser, as soon as the first end is connected to the seabed installation and the second end is slackened.

Preferably, the seabed installation consists of the free end of a flowline which when resting on the seabed, is designed to completely take up the restoring force of the subsea riser.

Moreover, said second end of said subsea riser advantageously comprises a first frame and parallel arms joined together at one end in order to form a yoke, these being mounted so as to pivot on said first frame and designed to pivot between a first position, in which they extend longitudinally in the extension of said second end, and a second position, which is inclined to said first position. Thus, when the second end is slackened, the frame becomes plumb with said free end and the yoke is capable of being driven into said second position in order thereafter to be fastened to the seabed installation.

Furthermore, particularly advantageously, said free end of said flowline comprises a second guiding frame, an upstream part of which, extending from said free end along said flowline, includes at least one hook in which said yoke is designed to engage in said inclined second position. Thus, by driving the yoke into said second position, it bears on said second guiding frame and then, by further slackening the second end, which is still subjected to the restoring force of the catenary, said yoke attaches and catches in the hook. In this way, the yoke and the hook immobilize the second end of the subsea riser relative to the free end.

Preferably, said second guiding frame includes lateral guiding means for guiding said second end along the axis of said free end. In this way, upon fully slackening the second end, said first frame rests on the seabed, being guided, by the yoke that pivots at one of its ends, into the hook and, at the other end around said first frame and is guided laterally by said lateral guiding means.

After the second end and the free end have been adjusted, one along the axis of the other, a connection is made. This connection may for example be made by means of the second guiding frame, which advantageously includes a device for driving said hook, said second end being driven toward said seabed installation so as to be connected thereto by known means.

BRIEF DESCRIPTION OF THE DRAWINGS

Other features and advantages of the invention will become apparent on reading the description given below of particular embodiments of the invention, given by way of indication but implying no limitation, with reference to the appended drawings in which.

DESCRIPTION OF A PREFERRED EMBODIMENT

Figure 1:
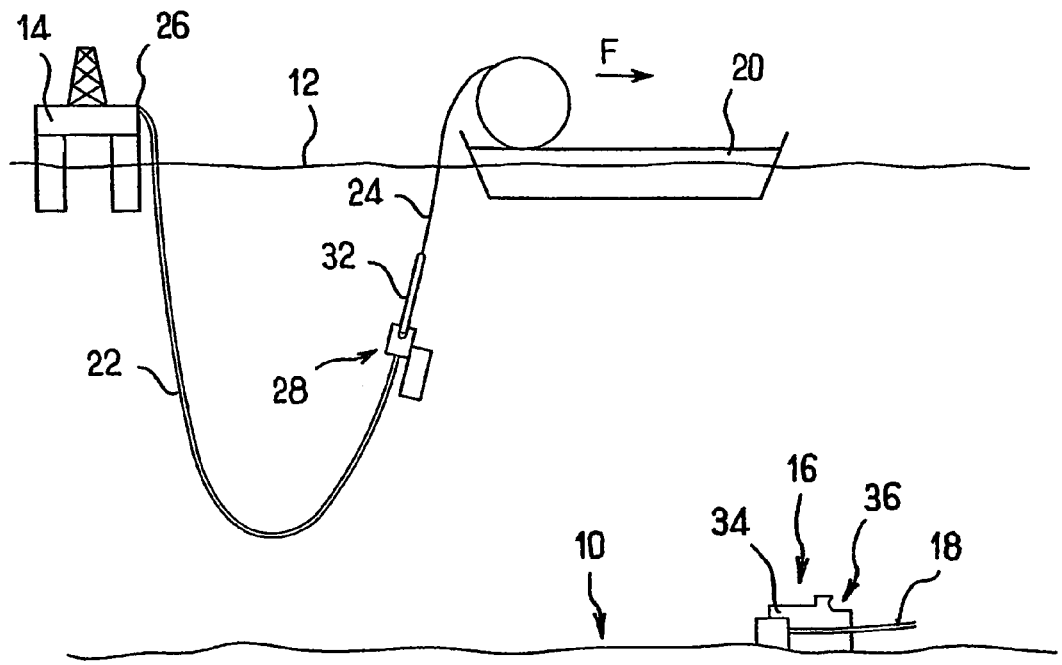
FIG. 1 is a schematic view in vertical section illustrating a first step in implementing the installation method according to the invention.

FIG. 1 shows, in section, the ocean or sea between the seabed 10 and the surface 12. An offshore installation 14, here consisting of an oil platform, floats on the surface 12 above a subsea or seabed installation 16, consisting of the free end of a flowline 18, which lies on the seabed 10.

In addition, a surface vessel 20 equipped with a reel on which a subsea riser 22 was initially wound and on which a traction cable 24 is partly wound, said surface vessel being located near the platform 14. The subsea riser 22 has a first end 26, which is firstly fastened to the platform, and a second end 28 that is connected to the cable 24 by connection means that will be explained in detail later in the description and that extends it as far as the surface vessel 20. The subsea riser 22 and the traction cable can be wound up onto the same reel. However, as soon as the subsea riser 22 is fully unwound and only its second end 28 is still attached to the surface vessel 20, said connection means and the traction cable 24 can be connected thereto.

Moreover, on the one hand, the second end 28 is at and includes a first frame 30 and parallel arms joined together at one end in order to form a yoke 32, which is mounted so as to pivot on the first frame 30 and which will be described in greater detail with reference to FIGS. 5 to 8, the yoke 32 extending here along the extension of said second end 28, and, on the other hand, the free end 16 of the flowline 18 includes a second guiding frame 34 having at least one hook 36 designed to receive said yoke 32, as will also be explained in detail later in the description. The yoke 32 forms mobile first connection means and the hooks 36 form second connection means. The first and second connection means and the frames constitute fastening means.

Figure 2:
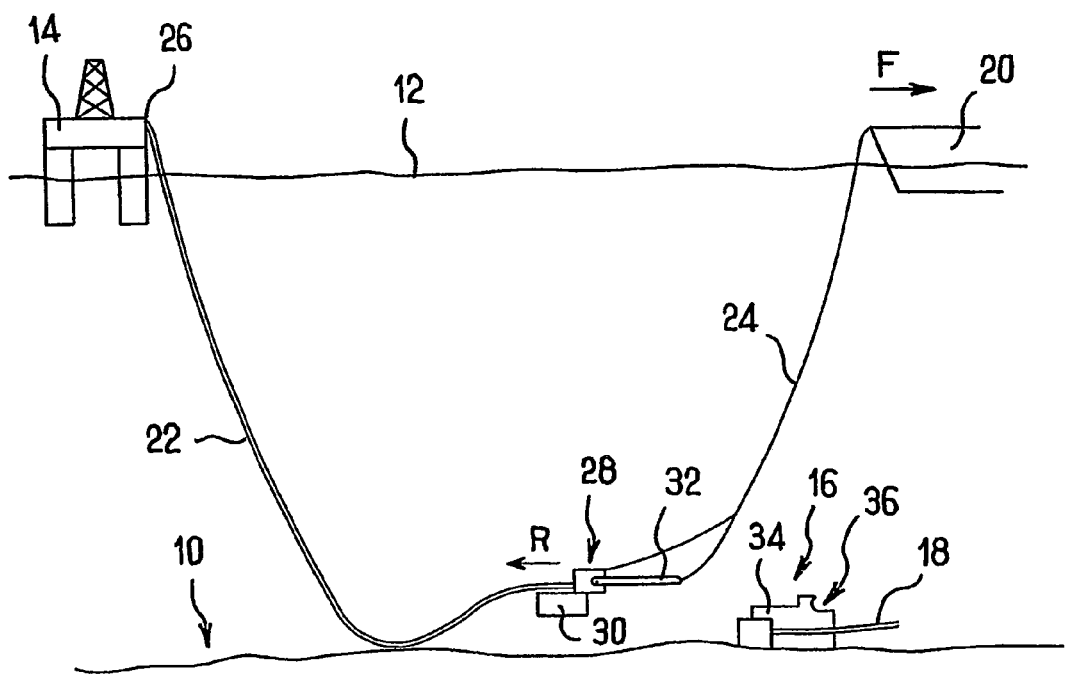
FIG. 2 is a schematic view in vertical section showing a second step after the first.

In another step, as illustrated in FIG. 2, in which all the elements shown in FIG. 1 can be seen, the second end 28 is guided toward the free end of the seabed installation 16 by means of the cable 24 and of the surface vessel 20, which drives it along the direction of the arrow F approximately along the axis of the flowline 18, and the subsea riser 22 is extended, said riser being heavy and therefore exerting a restoring force R in the opposite direction to that in which the second end 28 is being driven.

Figure 3:
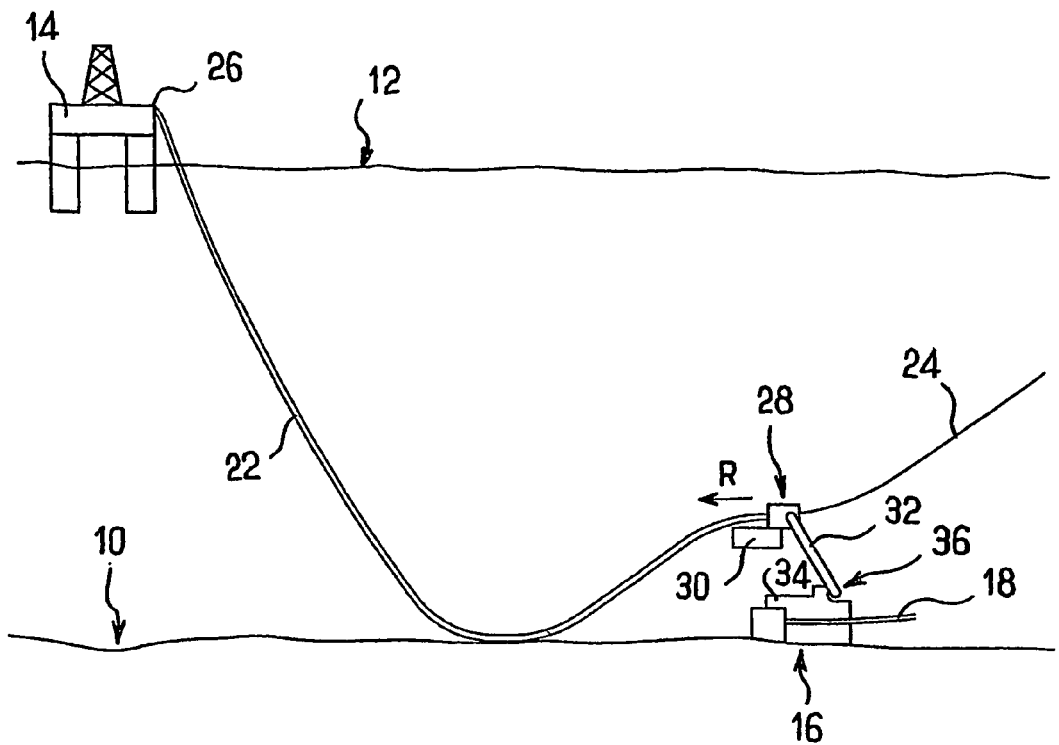
FIG. 3 is a schematic view in vertical section showing a third step after the second.

In yet another step, following from the previous one and illustrated in FIG. 3, the subsea riser 22 is extended further again by means of the cable 24 towed by the surface vessel so that the first frame 30 and the yoke 32 are made to approach opposite the second guiding frame 34 in order to engage the yoke 32 which pivots in the hook 36. As soon as the yoke 32 is engaged, by using the restoring force R, which until then had been compensated for by the pulling force on the cable 24, and therefore by progressively slackening the cable 24, the yoke 32 catches in the hook 36 and the loads from the restoring force R are progressively transferred to the second guiding frame 34.

Figure 4:
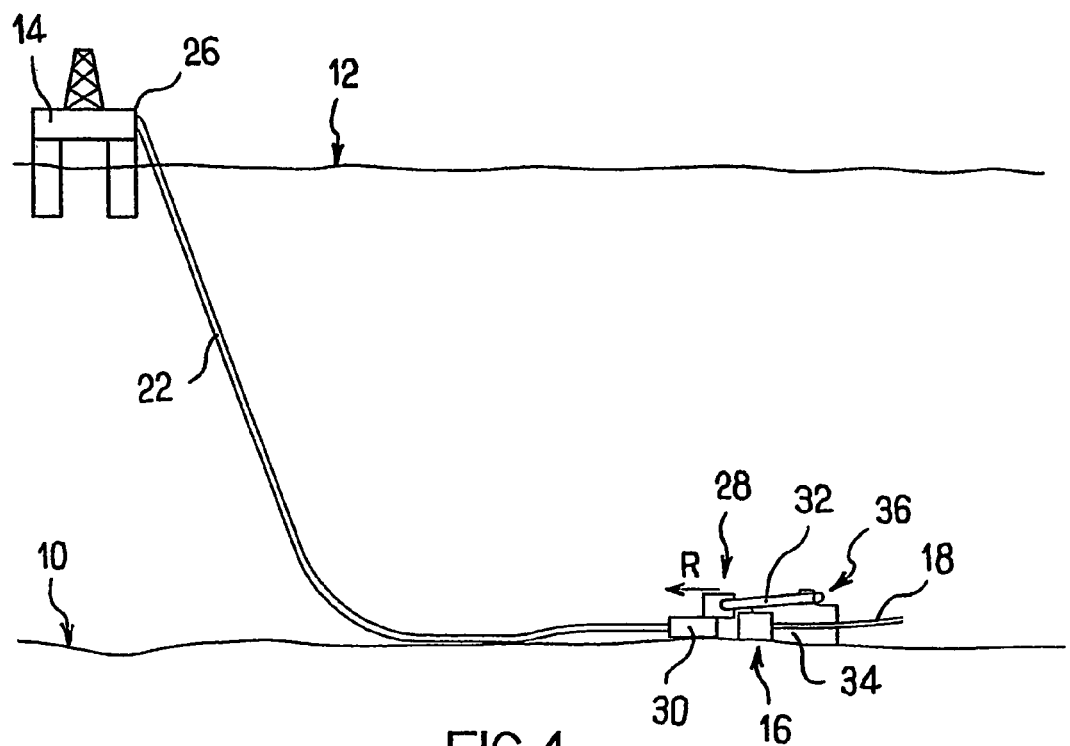
FIG. 4 is a schematic view in vertical section showing a fourth step after the third.

By slackening the cable 24 even further, the equilibrium situation illustrated in FIG. 4 is reached, in which the first frame 30 is positioned so as to bear on the seabed 10 after having pivoted about the free end 16 by means of the yoke 32, which itself has pivoted about the hook 36 and the first frame 30. The restoring force R exerted by the subsea riser is then taken up entirely by the frictional forces between the flowline 18 and the first frame 30 on the seabed floor.

Depending on the field configuration and in particular on the potential movements of the surface installation, it is generally recommended that a portion of the riser rest on the seafloor before the connection.

When installing the riser, this portion remaining on the seafloor makes it possible to reduce the force exerted by the catenary at the second end 28, which is extended by the cable 24, this force being reduced to an acceptable value R.

The way in which the subsea riser is connected to the flowline will be explained in greater detail with reference to FIGS. 7 and 8.

The device suitable for implementing the invention can now be explained in detail with reference to FIG. 5 in a step of the installation method between the step illustrated in FIG. 2 and the step shown in FIG. 3.

In this FIG. 5, there are again the flowline 18. The free end of the flowline 18 is accompanied by the second guiding frame 34 that is connected to it and has hooks 36, and the subsea riser 22, the second end 28 of which has the first frame 30 on which the yoke 32 is pivotally mounted, said yoke consisting of two parallel arms 40, 42 joined at the end by an arch 44.

The second frame 34, which is entirely attached to the flowline 18, is designed to rest on the seabed 10 and the seabed installation 16 is extended in the form of a swan-neck and terminates in a connection end-fitting 46 lying above the mean plane defined by the second guiding frame 34.

Moreover, it includes parallel spaced-apart guiding and protection arches 48 that extend transversely across the second frame and go around the free end of the flowline 18 so that they are perpendicular to the axis of the flowline 18 and also includes conical guiding housings 50 oriented longitudinally and designed to house guiding rods 52 that extend longitudinally at the front of the first frame 30.

The hooks 36 are mounted toward the rear 53 of the second frame, upstream of the free end of the flowline 18, and are bent over toward the rear 53. Furthermore, in one advantageous embodiment, they can move translationally.

Moreover, the second end 28 of the riser, which is attached to the first frame 30, is also extended in the form of a swan-neck that terminates in a second connection end-fitting 54, lying above the mean plane of the first frame 30 and between the two arms 40, 42 of the yoke 32.

Figure 5:
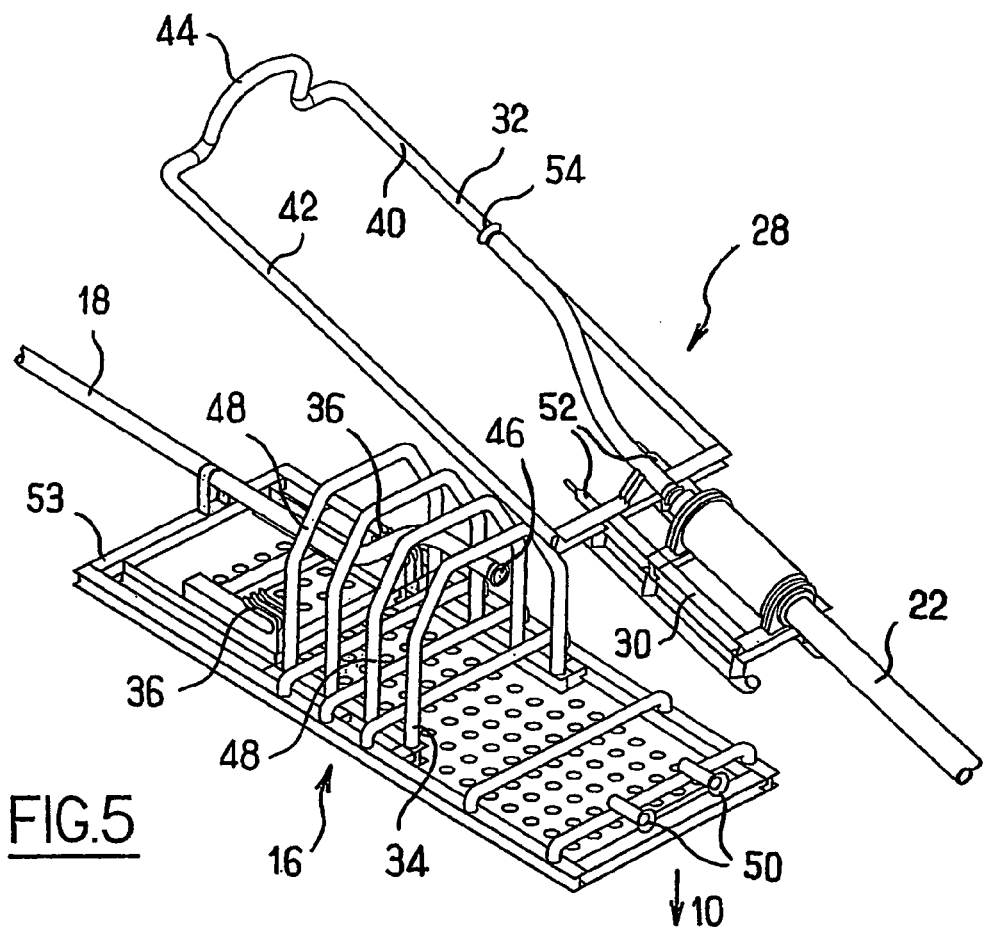
FIG. 5 is a schematic detail view in perspective of one embodiment of the invention illustrating the installation method between the second and third step.

The second end 28 as shown in FIG. 5 does not include the cable, which is connected to it and makes it possible both to pull the yoke 32 and hold it in place in its extension during this step, so as to simplify this figure. For similar reasons, the swan-neck ends are not shown in FIGS. 1 to 4.

Figure 6:
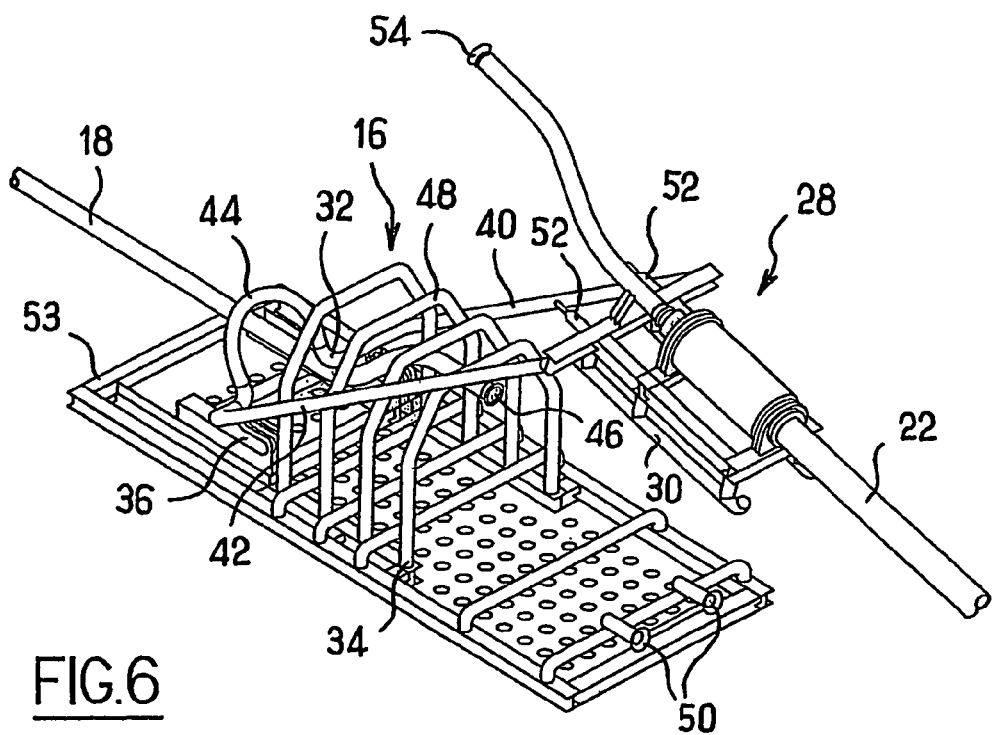
FIG. 6 is a schematic detail view of the embodiment illustrated in FIG. 5 in the installation method in accordance with the third step.

FIG. 6 shows the relative positions of the free end 16 and the second end 28 of the subsea riser 22 during the step illustrated in FIG. 3.

Thus, the yoke 32 has pivoted with respect to the first frame 30 and, on the one hand, the ends of the arms joined together by the arch 44 are engaged in the hooks 36 by pressing on the second frame 34 and, on the other hand, by pivoting, the arms 40, 42, which are spaced apart by a distance approximately equal to the width of the guiding and protection arches 48, have been guided by these guiding arches 48. In this way not only is the yoke 32 capable of being fastened in the hooks 36 but the second end 28 of the subsea riser is in alignment with the free end of the flowline 18.

Figure 7:
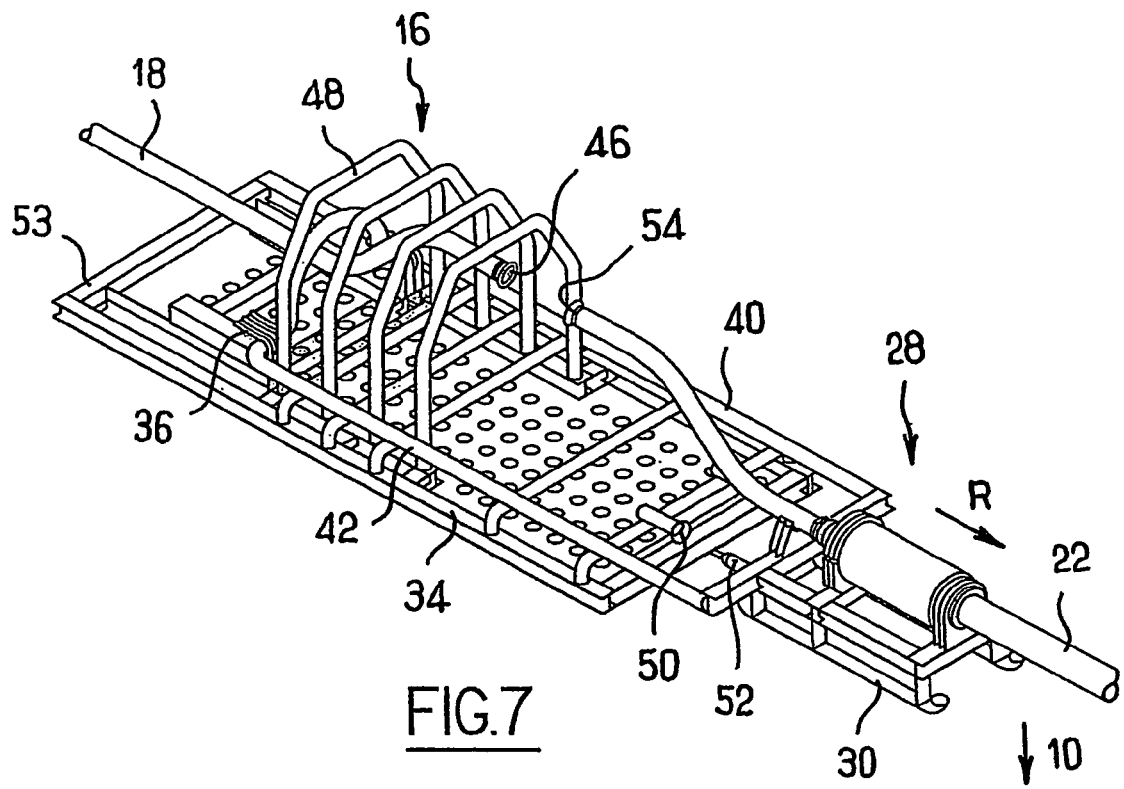
FIG. 7 is a schematic detail view of the embodiment illustrated in the previous figure in accordance with the fourth step.

FIG. 7 illustrates the device according to the invention in the step illustrated in FIG. 4. The first frame 30 rests here on the seabed 10, the yoke 32 is held fast in the hooks 36 which transmit, to the flowline 18, the restoring force exerted by the subsea riser 22, and the arms 40, 42 of the yoke 32 are held in place laterally by the guiding and protection arches 48. In this position, the connection end-fittings 46, 54 which terminate the swan-necks lie opposite each other and the guiding rods 52 lie respectively along the axis of and facing the conical guiding housings 50.

Thus, the restoring force from the subsea riser is transmitted to the seabed installation and the connection between the second end of the riser and the seabed installation may be made without said restoring force being exerted on the actual connection.

In this situation, the presence of a surface vessel is no longer absolutely necessary, since the remotely operated subsea robots (not shown) are designed to make the actual connection.

Thus, thanks to the hooks 36 that can move translationally and are designed to be driven toward the rear 53 of the second frame 34 by driving means (not shown), for example worms, jacks, or the like, the yoke 32 is designed to drive the first frame 30 toward the second frame 34 so that the guiding rods 52 can be inserted into the conical guiding housings 50 so as to guide the first frame 30 relative to the second frame 34. Said worms are, for example, designed to be rotated by said subsea robots. Consequently, the connection end-fittings 46, 54, which are already facing each other, are joined together to allow them to be connected when the hooks 36 are at the end of travel of the second frame 34 toward the rear 53. Said robots are also designed to carry out the various steps of the connection, such as the cleaning and sealing steps, or other operations.

Figure 8:
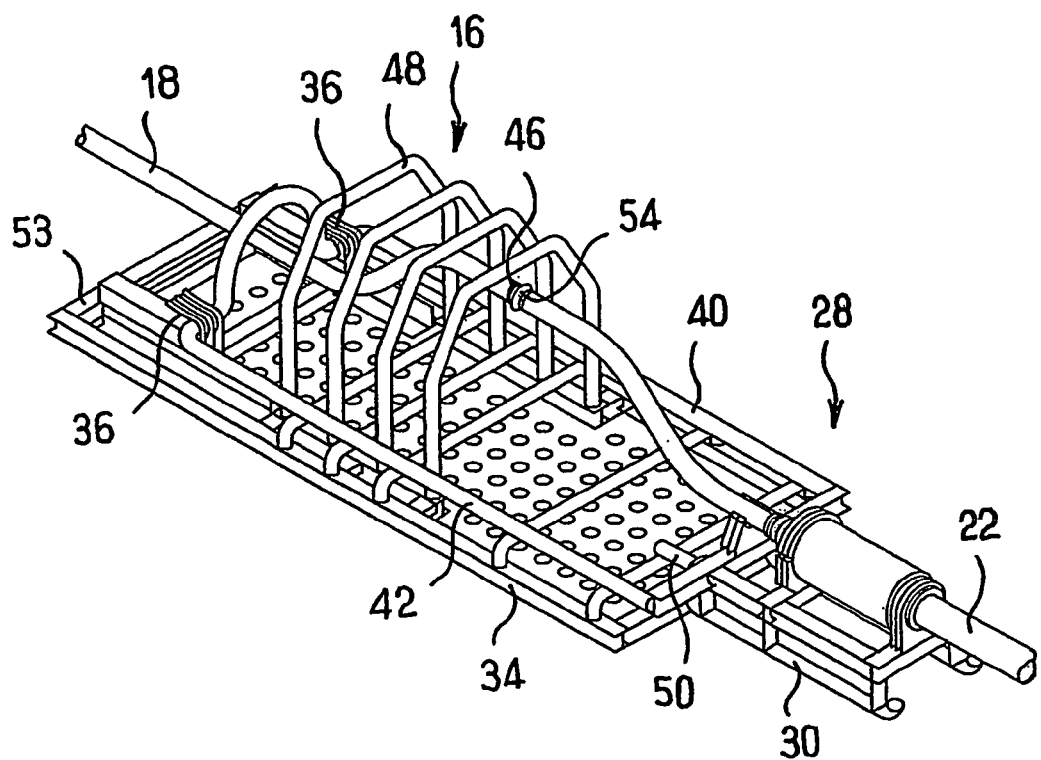
FIG. 8 is a schematic detail view of the embodiment illustrated in the previous figure using the installation method in accordance with a fifth step, following the fourth.

FIG. 8 illustrates such a configuration in which the connection end-fittings 46, 54 are connected together and the second end 28 of the subsea riser 22 is held in a fixed position relative to the free end of the flowline 18 thanks to the hooks 36 and the yoke 32.

A seabed installation consisting of a flowline has been described above, this having the advantage of being able to pick up the entire restoring force of the subsea riser. However, it would not be outside the scope of the invention to provide a seabed installation formed from a collector, which would be anchored to the seabed in order to take up the restoring force.

The invention claimed is:

1. A method for installing and connecting by use of a surface vessel a subsea riser between a seabed installation placed on a seabed and a second installation that lies above the seabed installation, the subsea riser having a first end and a second end, the method comprising the following steps in order:
   a) connecting the first end of the subsea riser to the second installation and connecting the second end of the subsea riser to a cable extending to the surface vessel;
   b) deploying the subsea riser in a catenary between the second installation and the seabed installation without establishing an initial connection between the second end of the deployed subsea riser and the seabed installation;
   c) next, guiding the second end of the deployed subsea riser toward the seabed installation by driving the cable and the surface vessel in a first direction along a sea surface or parallel thereto and by extending the subsea riser wherein such that the extending of the subsea riser exerts a restoring force on the second end in a second direction opposite to the first direction;
   d) connecting the second end of the subsea riser to the seabed installation, while slackening the second end to position the second end to face the seabed installation under the restoring force on the second end and to transfer a load of the restoring force on the second end to the seabed installation; and
   e) fastening the second end of the subsea riser to the seabed installation utilizing the load of the of the restoring force.

2. The method for installing the subsea riser as claimed in claim 1, wherein the seabed installation comprises a free end of a flowline.

3. The method for installing the sub sea riser as claimed in claim 1, wherein the second end of the subsea riser includes mobile first connections, the seabed installation includes second connections, and the mobile first connections are engaged in the second connections before the slackening of the second end to fasten the second end to the seabed installation.

4. The method for installing the subsea riser as claimed in claim 1, wherein the cable is unconnected to the seabed installation.

5. The method for installing the subsea riser as claimed in claim 4, wherein the seabed installation comprises a free end of a flowline, and the surface vessel extends the subsea riser by orienting a lower portion of the subsea riser in a direction parallel to the flowline until said second end of the subsea riser is located in line with the seabed installation.

6. The method for installing the subsea riser as claimed in claim 1, further comprising fastening the second end of the subsea riser and the seabed installation together after the second end of the subsea riser contacts the seabed installation.

7. A device for installing and connecting a subsea riser between a seabed installation placed on a seabed and another installation that lies above the seabed installation, the device comprising:
   a first end of the sub sea riser;
   a second end of the subsea riser, the second end comprising a first guiding frame and parallel arms joined together at one end of the arms to form a yoke, the arms being mounted to pivot on the first guiding frame between a first position, in which the arms extend longitudinally in extension of the second end of the subsea riser, and a second position inclined to the first position;
   connectors operable to connect the first end of the subsea riser to the other installation;
   a deployment device operable to deploy the subsea riser in a catenary between the other installation and the seabed installation without establishing a connection between the second end of the subsea riser and the seabed installation;
   a guiding device operable to guide the second end of the subsea riser to face toward the seabed installation by extending the subsea riser, the subsea riser exerting a restoring force on the second end of the subsea riser, the guiding device further being operable to slacken the second end of the subsea riser to position the subsea riser so that the second end of the subsea riser faces the seabed installation due to the restoring force and to transfer a load of the restoring force to the seabed installation;
   fastenings positioned and configured to fasten the second end of the subsea riser to the seabed installation after the second end contacts the seabed installation.

8. The device for installing and connecting the subsea riser as claimed in claim 7, wherein the seabed installation comprises a free end of a flowline.

9. The device for installing and connecting the subsea riser as claimed in claim 7, wherein the seabed installation comprises a free end of a flowline, the free end of the flowline comprising a second guiding frame having an upstream part which extends from the free end of the flowline along the flowline and includes at least one hook in which the yoke engages in the inclined second position.

10. The device for installing and connecting the subsea riser as claimed in claim 9, wherein the second guiding frame includes lateral guides operable to guide the second end of the subsea riser along an axis of the free end of the flowline.

11. The device for installing and connecting the subsea riser as claimed in claim 9, wherein the second guiding frame includes a driver operable to drive the at least one hook and to drive the second end of the subsea riser toward the seabed installation.

12. The method for installing the subsea riser as claimed in claim 1, wherein the driving of the cable in the first direction increases a distance in the first direction of the surface vessel from the second installation.

* * * * *